Figure 1:
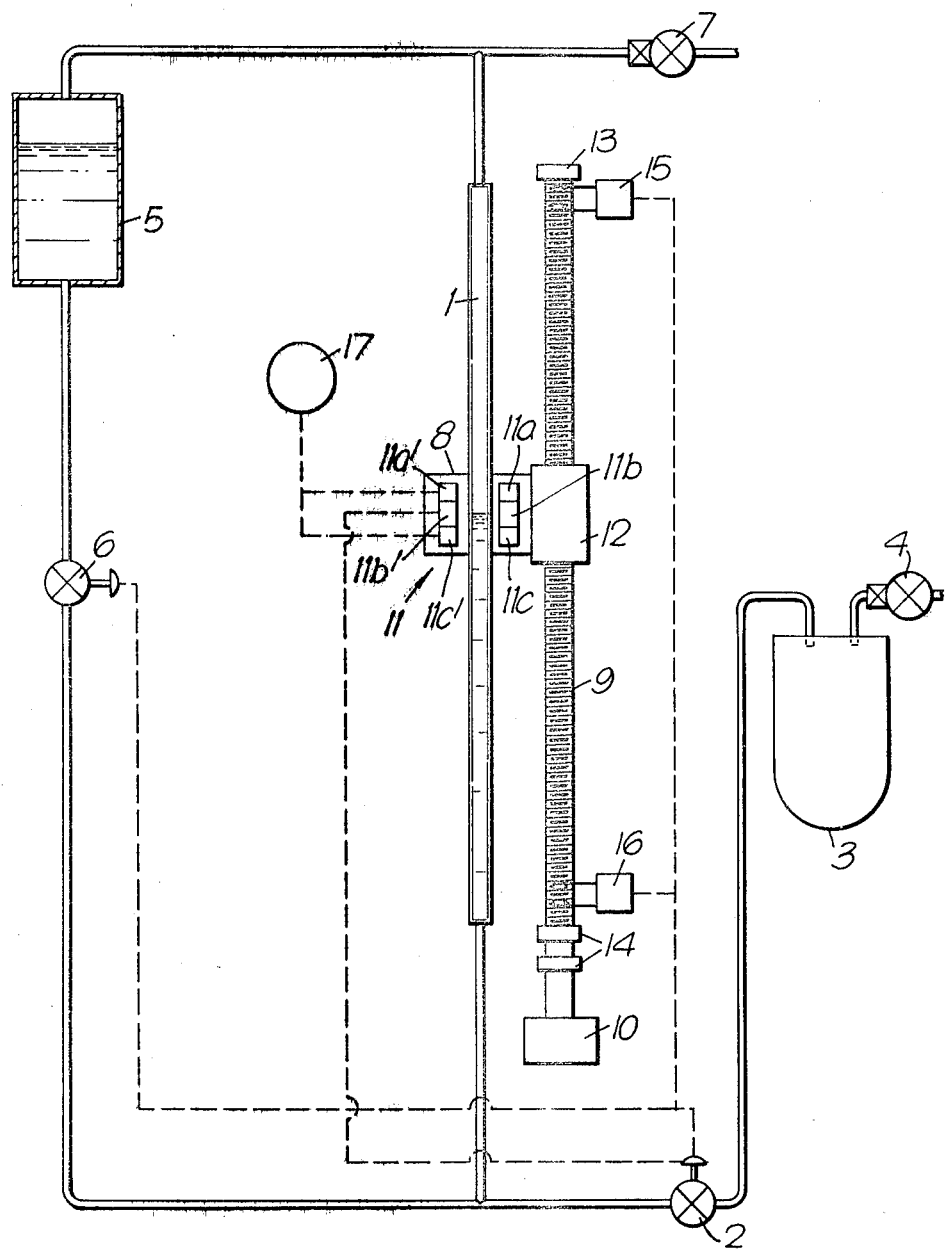

United States Patent [19]

Pearson

[11] 4,257,437

[45] Mar. 24, 1981

[54] LIQUID FLOW CONTROL

[75] Inventor: William B. Pearson, Middlesbrough, England

[73] Assignee: Imperial Chemical Industries Limited, London, England

[21] Appl. No.: 4,922

[22] Filed: Jan. 19, 1979

[30] Foreign Application Priority Data

Feb. 8, 1978 [GB] United Kingdom ............... 5044/78

[51] Int. Cl.³ ........................................... G05D 7/00
[52] U.S. Cl. ...................................... 137/8; 137/396
[58] Field of Search ............. 137/395, 396, 8, 624.13, 137/624.15; 222/64

[56] References Cited

U.S. PATENT DOCUMENTS

| | | | |
|---|---|---|---|
| 2,814,303 | 11/1957 | Fifer | 137/8 |
| 3,446,222 | 5/1969 | Barker | 137/395 X |

Primary Examiner—Alan Cohan
Attorney, Agent, or Firm—Cushman, Darby & Cushman

[57] ABSTRACT

A method and apparatus to control the flow of liquid through a valve, especially at very low levels down to about 0.5 ml/hour, by monitoring the liquid level in a column of liquid using a sensor, for example a photoelectric cell, which is moved along the column at a predetermined rate corresponding to the liquid flow rate desired, generating a signal from the sensor which is representative of the liquid level, and using the signal to control the opening and closing of the valve to maintain the liquid flow at the desired rate.

9 Claims, 2 Drawing Figures

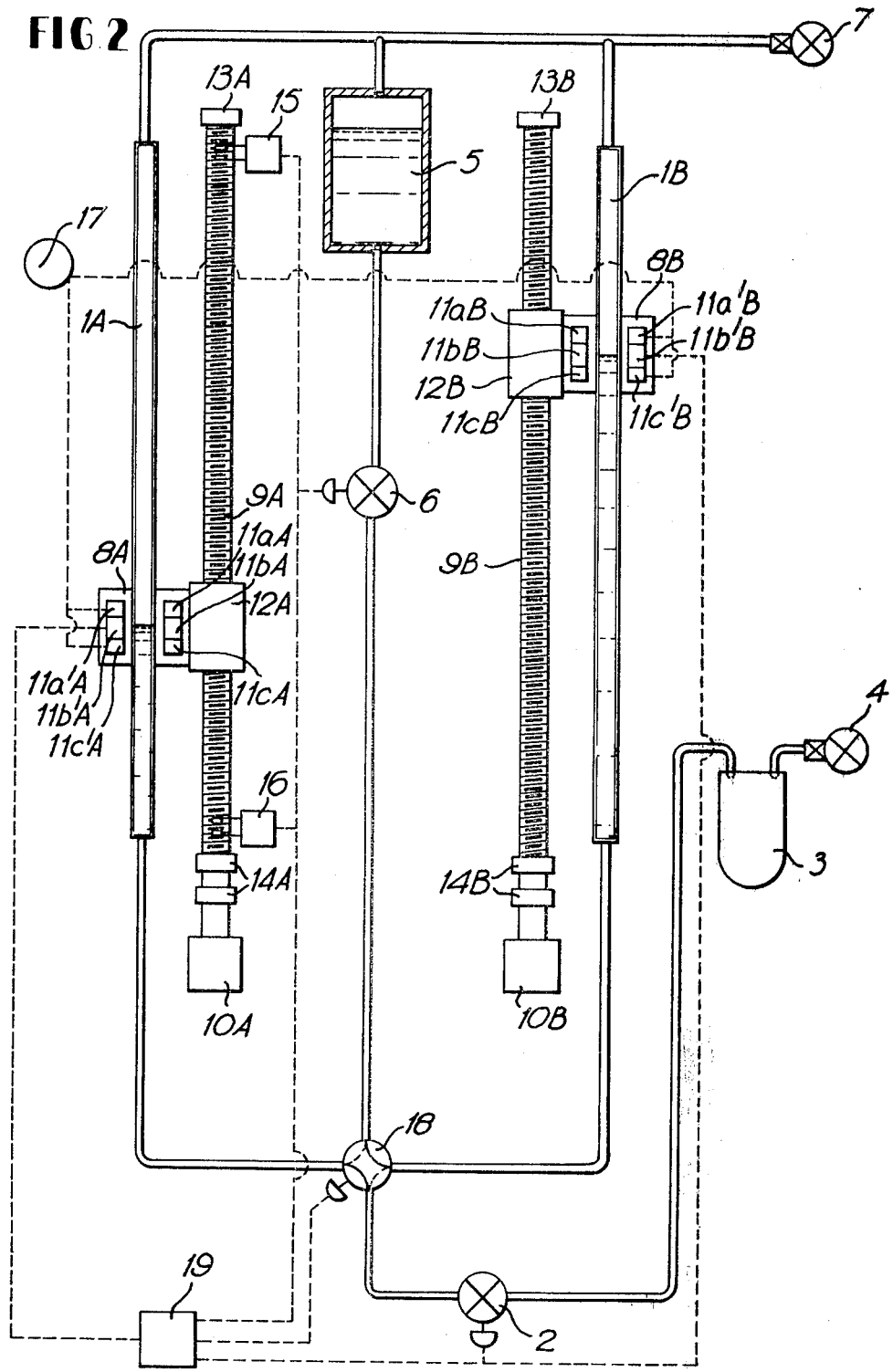

LIQUID FLOW CONTROL

THE PRESENT INVENTION relates to a method and apparatus for the accurate control of the rate of flow of a liquid through a valve.

The flow of liquids along conduits occurs in very many industrial processes and it is often necessary to control the flow of these liquids at pre-determined, and sometimes variable, rates. In large-scale processes, adequate flow control of the large volumes of liquid involved is relatively easily achieved. Even in processes which require relatively small liquid flows, say of a gallon or more per hour, it is possible to control the liquid flow rate with a good degree of accuracy. However, it has been found that difficulties of control become more and more pronounced at lower flow rates.

In the chemical and other industries in recent years, it has become common to use testing equipment and laboratory apparatus in which only very small flow rates, for example down to only a few milliliters/hour, are employed. The use of such low flow rates has a number of advantages but it is an important prerequisite that random variations in the flow rates should be minimised. Unfortunately, it has not always been possible to assure a constant rate of flow at low flow rates and so the process operator has sometimes been forced to use a higher flow rate than would otherwise have been necessary, this therefore necessitating, for example, a larger volume of material and bigger apparatus or the use of a diluent. One method which has been used to achieve low flow rates involves the use of a variable egging pressure to push the liquid through a restrictor or fine capillary. Varying the pressure varies the flow rate. Unfortunately, this method is not wholly reliable since the merest particle of solid in the system upsets the rate and requires significant down time of the equipment to remove the solid particle.

According to the present invention a method of controlling the rate of flow of liquid from a column through a valve comprises moving a sensor for the level of liquid in the column along the column at a pre-determined rate corresponding to the desired rate of flow of liquid through the valve, generating a signal from the sensor which represents the liquid level in the column, and controlling the opening and closing of the valve in response to the signal generated by the sensor whereby liquid flows through the valve at the desired rate.

The sensor may be any device which senses and is responsive to the level of liquid in the column. For example, a light-sensitive sensor can be used if the column is made of glass or other transparent material. Other means of sensing the liquid level, all of which can be used in transparent or non-transparent material, are likely to include fibre optics, resonance, electrical capacitance and ultrasonics. These methods of sensing also have the advantages that they can be used at very high pressures and they can be used in systems which require the use of no moving parts except the valve or valves through which the liquid is to pass.

The column containing the liquid is preferably used in a vertical or near vertical position but the method of the invention is not limited to the use of a vertical column although this is likely to be the most convenient mode of operation. However, it is believed that the method of the invention can be used with columns which are positioned away from the vertical by as much as 30°, or even in some cases by as much as 60°.

In the method of the invention control of the opening of the valve in response to the liquid level signal from the sensor means that, in effect, the liquid level "follows" the sensor down the column. In a preferred embodiment of the method of the invention, the rate of flow is controlled within very narrow limits by the provision in the sensor of alarms which warn of exceptionally low or high flows respectively. One alarm sensor (the low flow sensor) is positioned above and the other (the high flow sensor) is positioned below the "normal flow" sensor but as close to the latter as possible. The alarm sensors are linked to the valve so that when the liquid level is opposite one of the alarms, a signal is generated to start the alarm and thereby draw the attention of the operator to the malfunction. He can then close the valve. Alternatively, if desired, the signal can be used to activate suitable closure means to close the valve as well as start the alarm.

When the column has been emptied, it is convenient to arrange for it to be refilled automatically from a reservoir positioned adjacent to and connected to the column. At the same time, the sensor can return to the top of the column. However, this arrangement means that, at intervals, there is a break in the flow of liquid through the valve. It is preferred, therefore, to provide a second column which is connected by a suitable switching arrangement to the first column and which is also provided with its own liquid level sensor. At a suitable point before the first column becomes empty of liquid, the second column can be switched in, either manually or, preferably, automatically upon receipt of a signal from the first column, to take over from the first column which is then refilled ready to take over in due course from the second column in the same way.

The present invention also includes apparatus for putting into effect the method herein described for controlling the rate of flow of a liquid through a valve and comprising a column for holding liquid for supply through a valve, sensing means to sense the level of liquid in the column and movable along the column at a pre-determined rate, the sensing means including means for generating a signal representative of the level of liquid in the column and means to convey said signal to control means controlling the opening and closing of said valve.

IN THE DRAWINGS:

FIG. 1 is a schematic elevational view of an apparatus for controlling the flow of a liquid through a valve, using a single column; and FIG. 2 is a schematic elevational view of a similar apparatus which includes two interconnected columns.

In the drawings, dotted lines indicate the paths of electric and/or pneumatic signals to and from the various components.

Referring to FIG. 1, a glass column 1 for liquid is connected at its lower end to a single-way pneumatically operated valve 2 and thence to a reactor vessel 3 which is to be fed with liquid. Means for applying pressure to the reactor vessel 3 is represented by the valve 4. The glass column is also connected to a reservoir 5 through another single-way pneumatically operated valve 6. Means to apply an "egging" pressure to the column 1 is represented by valve 7. (By "egging" pressure we mean a suitable pressure to keep the liquid in column 1 moving down the column when the valve 2 is open). Around the column 1 is mounted a platform 8 supported from a lead screw 9 and driven along the lead screw 9 by a stepping motor 10 controlled by an infinitely variable pulse generator (not shown). Stepping motor 10 may be positioned at either the bottom (as shown) or top end of the lead screw 9. Mounted on the platform 10 by means of a nut 12 is a photoelectric cell 11 consisting of three light emitters 11a, 11b and 11c, and three light detectors 11a', 11b' and 11c'. Bearings, 13 and 14 are fitted to the lead screw 9 at each end thereof.

Upper and lower limit switches 15 and 16 respectively, are provided at each end of the lead screw 9. Light detectors 11a' and 11c' of the photoelectric cell 11 are connected elctrically to an alarm 17 which may be audible or visible or both, as desired. Optionally, the signal from light detectors 11a' or 11c' may also be used to close valve 2.

In the drawing, the liquid level in column 1 is shown opposite the light emitter 11b and detector 11b'. In operation, the stepping motor is set to a pre-determined speed corresponding to the rate of flow of liquid required. In the drawing, the platform 8 is shown at a point which is about mid-way in its journey down the column 1. As the platform moves down, the signal from detector 11b' is passed if desired through a signal amplifier to the controlling mechanism of the valve to control the opening of valve 2 so that the liquid level in the column 1 moves down at the same, pre-determined, rate as the platform.

In the event that the valve 2 is open too wide with the result that the liquid level in the column 1 falls too quickly, then eventually detector 11c' will detect the liquid level and actuate alarm 17. Similarly, if valve 2 is not open wide enough, or if there is a blockage, thus causing the liquid level to fall too slowly for the desired rate of flow, the alarm 17 will be actuated when detector 11a' detects the liquid level.

When the nut 12 with the platform 8 reaches the bottom of the lead screw 9, it activates the lower switch 16. This simultaneously causes valve 2 to be closed, valve 6 to be opened, the alarm 17 to be de-activated and the motor 10 to be switched to fast reverse. Column 1 is then refilled from reservoir 5 via valve 6. The motor 10 drives the platform 8 upwards at a rate which exceeds that of the rising liquid level in the column 1. At the top of the column, the platform and upper side of nut 12 activate switch 15 and this causes the motor to be stopped and control of valves 2 and 6 to be transferred to the detector 11b' and emitter 11b of the photoelectric cell. When the rising liquid level is detected by detector 11b', the resultant signal immediately closes valve 6, controls valve 2, reactivates alarm 17 and starts the motor 10 to drive platform 8 down again at the pre-determined rate.

Figure 2 of the accompanying drawings illustrates a further embodiment of the present invention in which two interlinked columns are used thereby allowing continuous controlled flow of liquid into a reactor vessel.

Parts of the apparatus illustrated in FIG. 2 are identified using the same reference numerals as for the same parts in FIG. 1 except that, where appropriate, the postscripts "A" and "B" are used to indicate parts associated with the left-hand and right-hand columns respectively. As In FIG. 1, the paths of electric and/or pneumatic signals to and from the various components are indicated by dotted lines.

There are two additional components illustrated in FIG. 2. Valve 18 is a switching valve for switching feed/fill from column 1A to column 1B and vice versa.

In operation of the system, when column 1A becomes empty, limit switch 16 turns the valve 18 so as to connect the reactor 3 with column 1B and so as to connect the reservoir 5 with column 1A.

We have found that the method and apparatus of this invention enable a constant flow rate of liquid to be readily achieved with only very small variations. The method and apparatus are flexible so that flow rates as low as 0.5 ml/hour and at least as high as 50 ml/hour can be accurately achieved. However, the particular value of the method and apparatus of the invention lies in the achievement of the very low rates which hitherto have proved so difficult to obtain accurately. The system can be rapidly refilled and reset and it occupies little space.

The method and apparatus of the invention are also useful in the control of low flow rates of materials which are difficult to handle, for example aluminium alkyls which are pyrophoric in air and explosive in water and which in the presence of only a few ppm of oxygen or water decompose to solid alumina, thus choking lines. Hitherto, equipment used to achieve low flow rates has not only been somewhat inadequate at achieving accurate low flow rates but, because it has contained parts which have possible points of leakage, for example syringe pumps, has also led to difficulties in handling difficult materials such as aluminium alkyls. The method and apparatus of the present invention reduce such difficulties although they do not eliminate them altogether. For example, in the preferred embodiment described hereinbefore no fine orifices are required, the only sliding fits i.e. potential sources of leakage are in the glands of valves 2 and 6 and the egging gas provided through valve 7 can be easily dried and deoxygenated. Thus once the reservoir 5 is filled, there is a relatively small chance of leaks occurring.

I Claim:

1. A method of controlling the rate of flow of liquid from a column through a valve which comprises moving a sensor for the level of liquid in the column along the column at a pre-determined rate corresponding to the desired rate of flow of liquid through the valve, generating a signal from the sensor which represents the liquid level in the column relative to the sensor, and controlling the opening and closing of the valve in response to the signal generated by the sensor whereby liquid flows through the valve at the desired rate.

2. A method as claimed in claim 1 in which the sensor used is a light-sensitive sensor.

3. A method as claimed in claim 1 in which the column is used in a vertical or near vertical position.

4. A method as claimed in claim 1 in which the rate of liquid flow is monitored by at least one sensor which is used in a co-operative relationship with the sensor for the liquid level to generate a signal if the rate of liquid flow is outside pre-determined higher or lower limits.

5. A method as claimed in claim 1 in which the flow of liquid to the valve is supplied from one or other of at least two columns, each of which is provided with its own liquid level sensor, the columns being interconnected by a switching arrangement whereby liquid is supplied from each column in turn to provide a continuous flow to the valve.

6. Apparatus for controlling the rate of flow of liquid through a valve which comprises a column for holding the liquid, sensing means for the level of liquid in the column and movable along the column at a pre-determined rate, the sensing means including means for generating a signal representative of the level of liquid in the column relative to the sensor, and means to convey said signal to control means controlling the opening and closing of the valve.

7. Apparatus as claimed in claim 6 in which the sensing means is a light-sensitive sensor.

8. Apparatus as claimed in claim 6 and including sensing means to work in co-operative relationship with the liquid level sensing means to monitor the rate of liquid flow and generate a signal if the rate of liquid flow is outside pre-determined higher or lower limits.

9. Apparatus as claimed in claim 6 comprising at least two columns for holding the liquid, each column having sensing means for the level of liquid in that column, and switching means to allow the flow of liquid from one column to be terminated and to be immediately replaced by flow of liquid from another column without interruption to the flow of liquid through the valve.

* * * * *